United States Patent [19]

Inoue et al.

[11] Patent Number: 5,328,970
[45] Date of Patent: Jul. 12, 1994

[54] LIVING POLYMERIZATION METHOD

[75] Inventors: Shohei Inoue, Tokyo; Takuzo Aida, Kashiwa; Masakatsu Kuroki; Tsuyoshi Watanabe, both of Tokyo; Chicara Kawamura, Hiratsuka, all of Japan

[73] Assignee: Kansai Paint Co., Ltd., Hyogo, Japan

[21] Appl. No.: 871,699

[22] Filed: Apr. 21, 1992

[30] Foreign Application Priority Data

Apr. 22, 1991 [JP] Japan .................. 3-116539

[51] Int. Cl.$^5$ ................ C08F 4/44; C08F 4/06; C08F 4/52; C08F 4/00; C08F 124/00; C08F 120/12
[52] U.S. Cl. ................ 526/161; 526/172; 526/189; 526/192; 526/204; 526/270; 526/273; 526/328
[58] Field of Search ........... 526/186, 190, 270, 273, 526/328, 161, 172, 189, 192, 204

[56] References Cited

U.S. PATENT DOCUMENTS 4,760,117  7/1988  Evans et al. .................. 525/394

FOREIGN PATENT DOCUMENTS 1259008  10/1989  Japan .
1259009  10/1989  Japan .

OTHER PUBLICATIONS

K. Shimasaki, T. Aida, and S. Inoue, Macromolecules 20, 3076–3080, 1987.
T. Adachi, H. Sugimoto, T. Aida, and S. Inoue, Macromolecules 25, 2280–2281, 1987.
S. Asano, T. Aida, and S. Inoue, J. Chem. Soc., Chem. Commun. pp. 1148–1149, 1985.

Primary Examiner—Joseph L. Schofer
Assistant Examiner—Wu C. Cheng
Attorney, Agent, or Firm—Wenderoth, Lind & Ponack

[57] ABSTRACT

A living polymerization method in which an organic aluminum compound having a bulky substituent group is used as a cocatalyst in the living polymerization of a (meth)acrylic acid ester, an epoxide or a lactone in the presence of a metal porphyrin complex as a polymerization initiator.

18 Claims, No Drawings

LIVING POLYMERIZATION METHOD

BACKGROUND OF THE INVENTION

1. Field of the Invention

The present invention relates to a living polymerization method for polymerizing (meth)acrylic acid esters, epoxides or lactones using a metal porphyrin complex as a polymerization initiator and an organic aluminum compound having a bulky substituent group as a cocatalyst.

2. Description of the Prior Art

A method of preparing poly(methacrylate) having a uniform molecular weight (that is, having a narrow molecular weight distribution) using an aluminum porphyrin complex as a polymerization initiator has already been known (cf., J. Am. Chem. Soc., vol. 109, 4737 (1987); Japanese Patent Application Laid-Open No. 259008/1989; and Japanese Patent Application Laid-Open No. 259009/1989).

However, in the aforementioned type of method, the polymerization rate is not so high. For example, in the case of polymerization of methyl methacrylate, the polymerization ratio is 65% for the polymerization time of 0.5 hour, and 100% for 1 hour. Thus, the method is insufficient in productivity (cf., Japanese Patent Application Laid-Open No. 259008/1989).

Similarly, there has already been known a method in which polyether or polyester is prepared from epoxide or lactone, respectively, using an aluminum porphyrin complex as a polymerization initiator (cf., Macromolecules, vol. 14, 1166 (1981); Macromolecules, vol. 20, 3076 (1987)).

However, the polymerization rates of propylene oxide and δ-valerolactone are not so high, more specifically 80% for 3.3 hours, and 53% for 1.3 hours, respectively. Therefore, this method is also unsatisfactory in productivity.

SUMMARY OF THE INVENTION

As a result of intensive investigation with a view to solving the aforementioned problems, the present inventors have now found that use of an organic aluminum compound having a bulky substituent group as a cocatalyst in a living polymerization reaction system using a metal porphyrin complex stabilizes the polymerization system and increases the polymerization rate of (meth)acrylate, epoxide or lactone, and enables preparation of a living polymer having a narrow molecular weight distribution. The present invention is based on this discovery.

According to the present invention, there is provided a living polymerization method for polymerizing at least one monomer selected from the group consisting of (meth)acrylic acid esters, epoxides and lactones using a metal porphyrin complex as a polymerization initiator, wherein the living polymerization is performed using as a cocatalyst at least one organic aluminum compound selected from the group consisting of compounds represented by general formula (I) or (II) below.

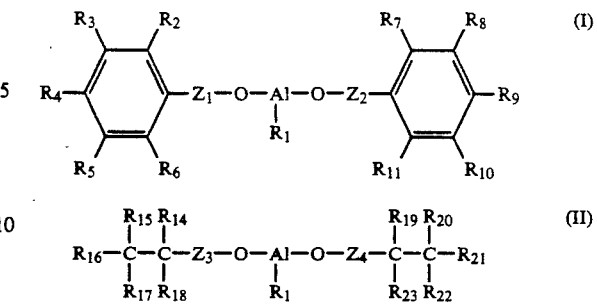

wherein
$R_1$ represents a halogen atom, a $C_1$-$C_8$ alkyl group, a $C_1$-$C_8$ haloalkyl group, a $C_2$-$C_8$ alkenyl group, a $C_6$-$C_{14}$ aryl group or a $C_7$-$C_{20}$ aralkyl group;

$R_2$, $R_4$, $R_6$, $R_7$, $R_9$ and $R_{11}$ independently represent a hydrogen atom, a halogen atom, a $C_1$-$C_{20}$ alkyl group, $C_1$-$C_{20}$ alkoxy group, or a $C_6$-$C_{14}$ aryl group;

$R_3$, $R_5$, $R_8$ and $R_{10}$ independently represent a hydrogen atom, or a halogen atom;

$Z_1$ and $Z_2$ independently represent a simple chemical bond,

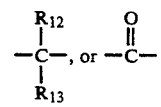

where, $R_{12}$ and $R_{13}$ independently represent a hydrogen atom, a $C_1$-$C_{20}$ alkyl group or $C_6$-$C_{14}$ aryl group;

$R_{14}$, $R_{15}$, $R_{16}$, $R_{17}$, $R_{18}$, $R_{20}$, $R_{21}$, $R_{22}$ and $R_{23}$ independently represent a hydrogen atom, a halogen atom, a $C_1$-$C_{20}$ alkyl group, or a $C_1$-$C_{20}$ alkoxy group; and $Z_3$ and $Z_4$ independently represent chemical bond,

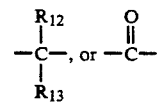

where, $R_{12}$ and $R_{13}$ have the same meanings as defined above.

DETAILED DESCRIPTION OF THE INVENTION

Hereafter, the living polymerization method of the present invention will be described in detail.

The "alkyl" group as used herein may be linear or branched, specific examples of which include methyl, ethyl, propyl, isopropyl, butyl, isobutyl, sec-butyl, tert-butyl, pentyl, isoamyl, hexyl heptyl, octyl, 2-ethylhexyl, 3,5,5-trimethylhexyl, nonyl, decyl, dodecyl, trimethylnonyl, hexadecyl, octadecyl, etc.

The "haloalkyl" group as used herein refers to an alkyl group of which at least one of the hydrogen atoms bonded to the carbon atoms of the aforementioned alkyl group is substituted with a halogen atom, for example, a fluorine atom, a chlorine atom, a bromine atom or an iodine atom, and includes, for example, fluoromethyl, chloromethyl, dichloromethyl, bromomethyl, iodomethyl, 1-chloroethyl, 1,1-dichloroethyl, 1-chloro-2-bromoethyl, etc.

Also, the "alkenyl" group as used herein may be linear or branched, and includes, for example, vinyl, allyl, 1-propenyl, isoprenyl, 2-butenyl, etc.

The "alkoxy" group and "alkylthio" group as used herein refer to an alkyl-O- group and an alkyl-S-group each alkyl moiety of which has the aforementioned meaning. Specific examples of the alkoxy group include methoxy, ethoxy, propoxy, isopropoxy, butoxy, tert-butoxy, pentoxy, amyloxy, hexoxy, etc. Specific examples of the alkylthio group include methylthio, ethylthio, propylthio isopropylthio, butylthio, etc.

The "aryl" group may be of monocyclic type or polycyclic type, specific examples of which include phenyl, naphthyl, acenaphthenyl, fluorenyl, phenanthrenyl, anthryl, tolyl, xylyl, mesityl, cumenyl, etc.

The "aralkyl" group as used herein refers to an arylalkyl group of which the aryl and alkyl moieties have the aforementioned meanings, respectively, and specific examples thereof include benzyl, phenethyl, benzhydryl, trityl, etc.

The living polymerization method of the present invention can be carried out in the presence of a metal porphyrin complex as a polymerization initiator. As the metal porphyrin complex, there can also be used those metal porphyrin complexes known per se employed as the polymerization initiator in the living polymerization of monomers such as (meth)acrylate, epoxide, lactone, etc. For example, there can be cited metal porphyrin complexes whose central metal position is occupied by magnesium, aluminum, vanadium, chromium, manganese, iron, cobalt, nickel, copper, zinc, ruthenium, rhodium, palladium, cadmium, etc. Among the central metals, preferred are magnesium, aluminum, iron, copper, etc., with aluminum being particularly suitable.

The metal porphyrin complex having aluminum at the central metal position includes, for example, an aluminum porphyrin complex represented by general formula (III)

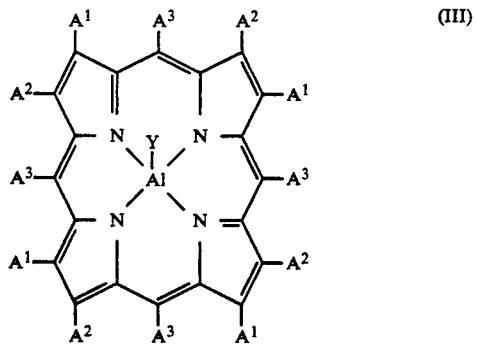

(III)

wherein $A^1$ and $A^2$ independently represent a hydrogen atom, or a monovalent $C_1$-$C_{10}$ hydrocarbon group (for example, an alkyl group, an alkenyl group, a phenyl group, an aralkyl group, etc.; preferably a $C_1$-$C_8$ alkyl group);

$A^3$ represents a hydrogen atom or a monovalent $C_1$-$C_{20}$ hydrocarbon group which may be substituted with at least one, preferably 1 to 3 substituents selected from a halogen atom, a $C_1$-$C_8$ alkoxy group, a $C_2$-$C_8$ alkoxycarbonyl group, etc. (for example, an alkyl group, an alkenyl group, a phenyl group, a halophenyl group, an alkoxyphenyl group, etc.; preferably a phenyl group); and Y represent represents an axial ligand (for example, a halogen atom, a $C_1$-$C_8$ alkyl group, a $C_1$-$C_8$ haloalkyl group, a $C_1$-$C_8$ alkoxy group, a $C_1$-$C_8$ alkylthio group, a phenoxy group, a phenylthio group, a carboxyl group, an amino group, an enolate group, etc.).

Specific examples of the aluminum porphyrin complex include the following compounds:

Aluminum tetraphenyl porphyrin complex ($A^1$, $A^2$=a hydrogen atom, $A^3$=a phenyl group), Aluminum tetra(p-chlorophenyl) porphyrin complex ($A^1$, $A^2$=a hydrogen atom, $A^3$=a p-chlorophenyl group), Aluminum tetra(p-fluorophenyl) porphyrin complex ($A^1$, $A^2$=a hydrogen atom, $A^3$=a p-fluorophenyl group), Aluminum tetra(pentafluorophenyl) porphyrin complex ($A^1$, $A^2$=a hydrogen atom, $A^3$=a pentafluorophenyl group), Aluminum tetra(p-methoxyphenyl) porphyrin complex ($A^1$, $A^2$=a hydrogen atom, $A^3$=a p-methoxyphenyl group), Aluminum tetra(2,4,6-trimethoxyphenyl) porphyrin complex ($A^1$, $A^2$=a hydrogen atom, $A^3$=a 2,4,6-trimethoxyphenyl group), Aluminum ethyl methyl porphyrin complex ($A^1$=a methyl group $A^2$=an ethyl group, $A^3$=a hydrogen atom), Aluminum octaethyl porphyrin complex ($A^1$, $A^2$=an ethyl group, $A^3$=a hydrogen atom), Aluminum tetra(2,6-dichlorophenyl) porphyrin complex ($A^1$, $A^2$=a hydrogen atom, $A^3$=a 2,6-dichlorophenyl group), Aluminum tetra(2,4,6-trimethylphenyl) porphyrin complex ($A^1$, $A^2$=a hydrogen atom, $A^3$=a 2,4,6-trimethylphenyl group), Aluminum tetra(2,6-dimethoxyphenyl) porphyrin complex ($A^1$, $A^2$=a hydrogen atom, $A^3$=a 2,6-dimethoxyphenyl group), etc.

As the axial ligand (Y) for the aforementioned aluminum porphyrin complex, preferred are a $C_1$-$C_4$ alkyl group, a $C_1$-$C_4$ alkylthio group, a phenylthio group, an enolate group, etc.

Such aluminum porphyrin complexes as described above can be prepared, for example, by reacting porphyrins with organic aluminum compounds in an aprotic solvent under an inert gas atmosphere such as nitrogen, helium, argon or the like at a temperature within the range of about −78° C. to about 200° C.

As the organic aluminum compound which can be reacted with the porphyrins, there can be cited, for example, trialkylaluminums such as trimethylaluminum, triethylaluminum, tripropylaluminum, triisopropylaluminum, triisobutylaluminum, trioctylaluminum, etc.; tris(haloalkyl)aluminum such as tris(chloromethyl)aluminum, etc.; trialkenylaluminums such as tri-1-propenylaluminum, tri-2-butenylaluminum, triisoprenylaluminum, etc.; triarylaluminums such as triphenylaluminum, tri-p-tolylaluminum, tri-m-xylyl-aluminum, trimesitylaluminum, etc.; di(alkyl)aluminum halides such as dimethylaluminum bromide, dimethylaluminum chloride, diethylaluminum chloride, diethylaluminum iodide, etc.

On the other hand, as the aprotic solvent which can be used when the porphyrins are reacted with the organic aluminum compounds, there can be cited, for example, aromatic hydrocarbons such as benzene, toluene, xylene, etc.; aliphatic hydrocarbons such as pentane, heptane, hexane, cyclohexane, etc.; halogenated hydrocarbons such as methylene chloride, chloroform, carbon tetrachloride, dichloroethane, 1,3-bis(trifluoromethyl)benzene, trichlorofluoromethane, etc.; ethers such as diethyl ether, methyl ethyl ether, 1,4-dioxane, tetrahydrofuran, etc. However, the aprotic solvent used in the present invention is not limited to the aforementioned ones. If desired, these solvents may be used as they are also as polymerization solvent upon living polymerization reaction according to the present invention.

The aluminum porphyrin complexes thus obtained may contain as the axial ligand (Y) an alkyl group, a haloalkyl group, a halogen atom, etc., depending on the kind of the organic aluminum compound used. These complexes may be used as they are as a polymerization initiator. Alternatively, the aluminum porphyrin complexes can be converted to similar complexes but contain an alkoxy group, an alkylthio group, a phenoxy group, a phenylthio group, a carboxyl group, an enolate group, an amino group or the like by reacting them with active hydrogen compounds such as alcohols, thioalcohols, phenols, thiophenols, carboxylic acids, or amines, or α,β-unsaturated carbonyl compounds, ketones, lithium amides, etc.

The living polymerization method of the present invention has a major feature that living polymerization is performed using, in addition to the aforementioned metal porphyrin complex as a polymerization initiator, the organic aluminum compound represented by general formula (I) or (II) above, and having a structure sterically hindered against the metal porphyrin complex. It has been revealed that the present invention enables the coordination activation of polymerization active sites on a metal porphyrin complex, which could otherwise be impossible to attain unless the reaction temperature is as low as −40° C. or lower, even at room temperature.

For the aluminum compounds represented by general formulae (I) and (II), respectively, $R_1$ is preferably a $C_1$-$C_4$ alkyl group, a $C_1$-$C_4$ haloalkyl group, a $C_2$-$C_4$ alkenyl group, or a $C_6$-$C_{10}$ aryl group, with a methyl group being particularly preferred.

Further, in general formula (I), it is preferred that at least one of $R_2$, $R_4$ and $R_6$ and at least one of $R_7$, $R_9$ and $R_{11}$ independently are a halogen atom, a $C_1$-$C_8$, particularly $C_1$-$C_4$, alkyl group, a $C_1$-$C_8$, particularly $C_1$-$C_4$, alkoxy group, or a phenyl group, and remainders are each a hydrogen atom; and that $R_3$, $R_5$, $R_8$ and $R_{10}$ independently are a hydrogen atom or a halogen atom.

In general formula (I) above, it is preferred that $R_{12}$ and $R_{13}$ in the group

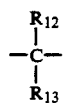

which may be represented by $Z_1$ and/or $Z_2$ independently represent a hydrogen atom, a $C_1$-$C_8$, particularly $C_1$-$C_4$, alkyl group or a phenyl group.

In general formula (II) above, it is preferred that at least one of $R_{14}$, $R_{15}$, $R_{16}$, $R_{17}$ and $R_{18}$, and at least one of $R_{19}$, $R_{20}$, $R_{21}$, $R_{22}$ and $R_{23}$ independently represent a halogen atom, a $C_1$-$C_8$, particularly $C_1$-$C_4$ alkyl group, or a $C_1$-$C_8$, particularly $C_1$-$C_4$ alkoxy group; and the remainders are each a hydrogen atom.

Further, in general formula (II) above, it is preferred that $R_{12}$ and $R_{13}$ in the group

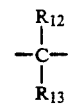

which may be represented by $Z_3$ and/or $Z_4$ independently represent a hydrogen atom, or a $C_1$-$C_8$, particularly $C_1$-$C_4$, alkyl group.

Specific examples of the organic aluminum compound represented by general formula (I) above include the following compounds:
Methylaluminum bis(2,4-di-tert-butylphenoxide),
Methylaluminum bis(2,4,6-tri-tert-butylphenoxide),
Methylaluminum bis(tetrafluorophenoxide),
Methylaluminum bis(2-tert-butyl-4-methoxyphenoxide),
Methylaluminum bis(2-phenylphenoxide),
Methylaluminum bis(2,6-dichlorophenoxide),
Methylaluminum bis(tetrafluorophenoxide),
Methylaluminum bis(2,6-dimethoxyphenoxide),
Methylaluminum bis(2-biphenylmethoxide),
Methylaluminum bis(benzhydroxide),
Methylaluminum bis(triphenylcarbinoxide),
Methylaluminum bis(phenylcarbonate),
Methylaluminum bis(4-methylphenylcarbonate),
Methylaluminum bis(4-methoxyphenylcarbonate),
Methylaluminum bis(2-biphenylcarbonate), etc.

Specific examples of the organic aluminum compound represented by general formula (II) above include the following compounds:
Methylaluminum bis(isobutoxide),
Methylaluminum bis(sec-butoxide),
Methylaluminum bis(butyrate),
Methylaluminum bis(isobutyrate), etc.

Particularly preferred among the organic aluminum compound represented by general formulae (I) and (II), respectively, are
Methylaluminum bis(2,4,6-tri-tert-butyl-phenoxide),
Methylaluminum bis(2-tert-butyl-4-methoxyphenoxide),
Methylaluminum bis(isobutoxide), and
Methylaluminum bis(isobutyrate).

The organic aluminum compounds represented by general formulae (I) and (II), respectively, which can be used in the present invention can be prepared, for example, by reacting a compound represented by general formula (IV) or (V) below:

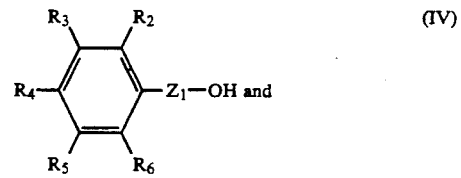

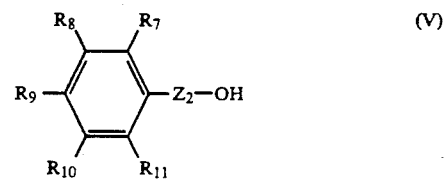

wherein $R_1$ through $R_{11}$, $Z_1$ and $Z_2$ have the same meanings as defined above, or a compound represented by general formula (IV) or (VII) below:

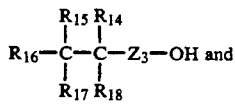
(VI)

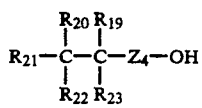
(VII)

wherein $R_{14}$ through $R_{23}$, $Z_3$ and $Z_4$ have the same meanings as defined above, with a compound represented by general formula (VIII) below:

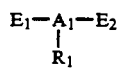
(VIII)

wherein $E_1$ and $S_2$ independently represent a halogen atom, a $C_1$-$C_8$ alkyl group, a $C_1$-$C_8$ haloalkyl group, a $C_2$-$C_8$ alkenyl group, a $C_6$-$C_{14}$ aryl group or a $C_7$-$C_{20}$ aralkyl group; and $R_1$ has the same meaning as defined above, in an aprotic solvent under an inert gas atmosphere such as nitrogen, helium, argon or the like at a temperature within the range of between about $-78°$ C. and about $200°$ C.

As the compound represented by general formula (IV) or (V), there can be cited, for example, phenols such as 2,4-di-tertbutylphenol, 2,4,6-tri-tertbutylphenol, 3-tert-butyl-4-hydroxyanisole, 2-phenylphenol, 2,6-dichlorophenol, tetrafluorophenol, 2,6-dimethoxyphenol, etc.; phenylcarbinols such as 2-biphenylmethanol, benzhydrol, triphenylcarbinol, etc.; and phenylcarboxylic acids such as benzoic acid, toluylic acid, 4-methoxybenzoic acid, 2-biphenylcaroxylic acid, etc.

As the compound represented by general formula (VI) or (VII), there can be cited, for example, alkanols such as isobutyl alcohol, sec-butyl alcohol, etc.; and alkanoic acids such as butyric acid, isobutyric acid, etc.

On the other hand, as the aluminum compound represented by general formula (VIII), there can be cited, for example, trialkylaluminums such as trimethylaluminum, triethylaluminum, tripropylaluminum, triisopropylaluminum, tributylaluminum, triisobutylaluminum, trioctylaluminum, etc.; tris(haloalkyl)aluminum such as tris(chloromethyl)-aluminum, etc.; trialkenylaluminums such as tri-1-propenylaluminum, tri-2-butenylaluminum, triisoprenyl-aluminum, etc.; triarylaluminums such as triphenyl-aluminum, tri-p-tolylaluminum, tri-m-xylylaluminum, trimesitylaluminum, etc.; and di(alkyl)aluminum halides such as dimethylaluminum bromide, dimethylaluminum chloride, diethylaluminum chloride, diethylaluminum iodide, etc.

As the aprotic solvent which can be used in the reaction of the compound represented by general formula (IV) or (V), or general formula (VI) or (VII), with the aluminum compound represented by general formula (VIII), there can be cited, for example, aromatic hydrocarbons such as benzene, toluene, xylene, etc.; aliphatic hydrocarbons such as pentane, heptane, hexane, cyclohexane, etc.; halogenated hydrocarbons such as methylene chloride, chloroform, carbon tetrachloride, dichloroethane, 1,3-bis(trifluoromethyl)benzene, trichlorotrifluoromethane, etc.; ethers such as diethyl ether, methyl ethyl ether, 1,4-dioxane, tetrahydrofuran, etc. However, the present invention is not limited to the aforementioned solvents. If desired, these solvents may be used as they are upon the living polymerization according to the present invention.

The monomers which can be living-polymerized according to the method of the present invention may be at least one compound selected from the group consisting of (meth)acrylic acid ester, epoxide and lactone, and there is no limitation on the kind of such monomers so far as they can be living-polymerized. These monomers may be used singly or two or more of them may be used in combination to copolymerize them.

The (meth)acrylic acid ester which can be used in the living polymerization include those compounds represented by general formulae (IX), (X), (XI) and (XII) below:

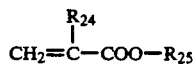
(IX)

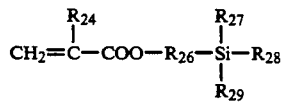
(X)

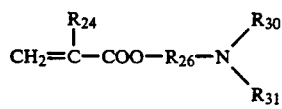
(XI)

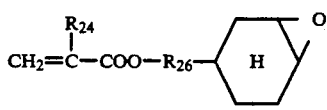
(XII)

wherein $R_{24}$ represents a hydrogen atom or a methyl group;
$R_{25}$ represents a $C_1$-$C_{20}$ alkyl group, a $C_3$-$C_8$ cycloalkyl group or a glycidyl group;
$R_{26}$ is $C_1$-$C_6$ alkylene group;
$R_{27}$, $R_{28}$ and $R_{29}$ independently represent a $C_1$-$C_6$ alkyl group or a $C_1$-$C_6$ alkoxy groups; and
$R_{30}$ and $R_{31}$ independently a $C_1$-$C_6$ alkyl group Specific examples of such a (meth)acrylic acid ester include methyl acrylate, methyl methacrylate, ethyl acrylate, ethyl methacrylate, propyl acrylate, propyl methacrylate, butyl acrylate, butyl methacrylate, isobutyl acrylate, isobutyl methacrylate, tert-butyl acrylate, tert-butyl methacrylate, hexyl acrylate, hexyl methacrylate, octyl acrylate, octyl methacrylate, lauryl acrylate, lauryl methacrylate, 2-ethylhexyl acrylate, 2-ethyl hexyl methacrylate, stearyl acrylate, stearyl methacrylate, cyclohexyl acrylate, cyclohexyl methacrylate, glycidyl acrylate, glycidyl methacrylate, 3,4-epoxycyclohexylmethyl acrylate, 3,4-epoxycyclohexylmethyl methacrylate, 3-trimethoxysilylpropyl acrylate, 3-trimethoxysilylpropyl methacrylate, 2-diethylaminoethyl acrylate, 2-diethylaminoethyl methacrylate, 2-dimethylaminoethyl acrylate, 2-dimethylaminoethyl methacrylate, etc. Among these compounds, preferred are methyl (meth)acrylates, ethyl (meth)acrylates, isopropyl (meth)acrylates, butyl (meth)acrylates, isobutyl (meth)acrylates.

The epoxide includes compounds which have one oxirane ring:

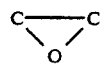

in the molecule, for example, ethylene oxide, propylene oxide, 1,2-butylene oxide, 1,2-pentylene oxide, 1,2-octylene oxide, styrene oxide, glycidyl acetate, glycidyl laurate, cardura E10 (glycidyl ester of versatic acid, a branched higher fatty acid, produced by Shell Chemical), butyl glycidyl ether, p-tert-butylphenyl glycidyl ether, dodecene oxide, allyl glycidyl ether, epichlorohydrin, cyclohexene oxide, cyclopentene oxide, $\beta$-(3,4-epoxycyclohexyl)ethyltrimethoxysilane, $\gamma$-glycidoxypropyltrimethoxysilane, etc. Among them, $C_2$–$C_4$ alkylene oxides such as ethylene oxide, propylene oxide, 1,2-butylene oxide, etc. are preferred.

The lactone includes, for example, 4- to 7-membered cyclic esters which may be substituted with one or two $C_1$–$C_4$ alkyl groups, $C_2$–$C_3$ alkenyl groups, etc. on the ring. Specific examples thereof include $\beta$-propionolactone, $\alpha$-methyl-$\beta$-propionolactone, $\alpha,\alpha'$-dimethyl-$\beta$-propionolactone, $\beta$-vinyl-$\beta$-propionolactone, $\gamma$-butyrolactone, $\delta$-valero-lactone, $\epsilon$-caprolactone, etc. $\gamma$-Butyrolactone, $\delta$-valerolactone and $\epsilon$-caprolactone are particularly preferred.

The living polymerization according to this invention, wherein said polymerization initiator, cocatalyst and monomer are used, can be conventionally carried out in the aforementioned aprotic solvent under an inert gas atmosphere such as nitrogen, argon, helium and the like.

The polymerization temperature is not limited particularly but may be varied within a wide range depending on the kinds of polymerization initiator, cocatalyst and monomers used, respectively. Generally, the polymerization temperature may be within the range of between about $-78°$ C. and the reflux temperature of the solvent, preferably between about $-40°$ C. and about $70°$ C.

The amount of the metal porphyrin complex to be used as the polymerization initiator is not limited strictly but may be varied depending on the kind of monomer and conditions of reaction used so far as it is effective for the polymerization reaction.

Generally, it is convenient that the metal porphyrin complex is used in an amount within the range of between 0.0005 mole and 0.2 mole, preferably between 0.002 mole and 0.1 mole, and more preferably between 0.005 mole and 0.05 mole, per mole of the monomer.

The amount of the organic aluminum compound represented by general formulae (I) or (II) above used as the cocatalyst together with the metal porphyrin complex is not limited strictly but may be varied depending on the kinds of the metal porphyrin complex and/or monomer and reaction conditions used. Usually, it is suitable that the organic aluminum compound is used in an amount within the range between 0.001 mole and 500 moles, preferably between 0.001 mole and 50 moles, and more preferably between 0.01 mole and 10 moles, per mole of the metal porphyrin complex used.

The timing at which the organic aluminum compound represented by general formula (I) or (II) above is introduced into the reaction system may be at any stage, i.e., prior to charging the monomer in a reaction vessel containing the polymerization initiator and solvent, simultaneous with the charging or after the charging, or after the initiation of the polymerization reaction following the charging of the monomer.

The polymerization may be performed until substantially all the monomer molecules are polymerized.

Living polymer can be obtained by the aforementioned polymerization reaction. The living polymer may have a number average molecular weight within the range between 500 and 200,000, and preferably between 1,000 and 50,000.

In the living polymerization described above, it is generally preferred to perform the polymerization under irradiation of light to increase the polymerization rate when (meth)acrylic acid esters are used as the monomer.

As the light to be irradiated, lights within the visible range are effective, and the type of light source is not limited particularly but there can be used any light source that emits a light having a wavelength (400 to 800 nm) within the visible range, for example, Xenon lamp, carbon arc lamp, low pressure mercury lamp, high pressure mercury lamp, metal halide lamp, etc. The method of the irradiation of light includes, for example, a method in which a light from 100 Watt Xenon lamp is irradiated at a distance of 10 cm continuously during the polymerization reaction.

According to the aforementioned living polymerization method of the present invention, the use of the organic aluminum compound having the specified bulky substituents represented by general formula (I) or (II) increases the polymerization rate of polymerization of a monomer ((meth)acrylic acid ester, epoxide or lactone), for example, methyl acrylate, by about 50,000 times as high as that of the polymerization in the presence of the conventional metal porphyrin complex. The polymerization rate increases surprisingly, e.g., by about 500 times in the case of polymerization of propylene oxide, and by about 10,000 times in the case of polymerization of $\delta$-valerolactone as compared with the conventional method. Hence, the time required for the polymerization ratio of the aforementioned monomer to reach 100% according to the polymerization method of the present invention is as short as several minutes or less in contrast to the conventional method which takes several hours to several ten hours to complete the reaction. Thus, the present invention increases the productivity of living polymer remarkably and unexpectedly.

The living polymers obtained by the method of the present invention, for example, poly(meth)acrylates from (meth)acrylic acid esters, polyethers from polyethers, polyesters from lactones, and the like, are polymers which have very narrow molecular weight distributions such as having Mw/Mn (parameter expressing molecular weight distribution) values of 1.3 or less, and their number average molecular weight is within the range between about 20,000 and about 50,000. The molecular weight distribution and molecular weight values indicate that the polymers obtained have tough physical properties.

The molecular weight and molecular weight distribution can be controlled by the charging ratio of the polymerization initiator (metal porphyrin complex)/cocatalyst (organic aluminum compound)/monomer, and hence according to the polymerization method of the present invention, polymers having any desired molecular weight and molecular weight distribution depending on the use of the polymer obtained, can be obtained at a considerably high polymerization rate.

Since the polymerization method of the present invention is a living polymerization in nature, the addition of the monomer again at the stage when the polymerization ratio has reached almost 100% enables the polymerization reaction to proceed further.

In this case, the monomer to be added again may be of the same kind of monomer as used in the polymerization in the preceding step or a different kind monomer. For example, the living polymer of a (meth)acrylic acid ester may be reacted with the (meth)acrylic acid ester again, or with propylene oxide or δ-valerolactone.

Also, when a monomer is added again which has the same basic skeleton as the monomer used in the living polymer already prepared but one or more different substituent groups than the monomer of the living polymer, a so-called block copolymer is obtained in which monomer units having the same skeleton but a different substituent structure have been copolymerized in a block. For example, when isobutyl methacrylate is added again to a living polymer of methyl methacrylate, there can be obtained a polymethyl methacrylate/polyisobutyl methacrylate block copolymer.

On the other hand, as described earlier, when a different kind of monomer is added to a living polymer from a certain monomer and polymerization is initiated again, a so-called multi-component block copolymer can be obtained in which the main skeleton is composed of different block structures, such as polyacrylate, polyester and polyether, bonded together.

As stated above, according to the method of the present invention, not only homopolymers of respective monomers but also random copolymers, block copolymers, multi-component block copolymers from any possible combinations of monomers depending upon various combinations of monomers can be prepared at very high polymerization rates by adding again monomers to a living polymer of a certain monomer followed by polymerization. Also, those copolymers having large molecular weights and narrow molecular weight distributions can be obtained.

The poly(meth)acrylates, polyethers, polyesters, random copolymers, block copolymers, or multicomponent block copolymers of these can be used for various purposes as described below as they are or after purification. The homopolymers or copolymers can be purified from their solution with a precipitant such as methanol, ethanol or the like, followed by washing, filtration and drying.

The living polymers such as poly(meth)acrylates, polyethers, polyesters, random copolymers, block copolymers, or multi-component block copolymers of these obtained by the method of the present invention can be used for various purposes depending on the properties of the polymer such as kind, structure, molecular weight, molecular weight distribution, etc. For example, they can be used in various fields such as coating material for metals, plastics, etc.; coatings for optical materials such as lenses; surface treatment of medical care materials; treating agent for fibers; insulating materials for electronic parts, circuit parts, etc.; electronic materials such as resist materials, etc.; printing materials, etc.

EXAMPLES

Next, the present invention will be described in more detail by reference examples and examples. However, these are intended to help understand the present invention and the present invention should not be construed as being limited thereto.

Unless otherwise indicated specifically, all the reactions or polymerizations in the following reference examples and examples were performed under nitrogen atmosphere. Also, all polymerization ratios were obtained by measuring a portion of polymerization reaction mixture (about 0.1 ml) as it is by $^1$H NMR and calculating polymerization ratio, P (%), by the following equation:

$$P(\%) = \frac{Sp}{SM + Sp} \times 100$$

assuming signal intensity of the monomer is Sm, and signal intensity of the polymer is Sp:

REFERENCE EXAMPLE 1

Preparation of Polymerization Initiator Solution A

In a sufficiently dried egg-plant type flask provided with a stirrer were charged 0.61 g (1 mmol) of meso-tetraphenylporphyrin and 40 ml of methylene chloride as a solvent. To the mixture was added 0.1 ml (1 mmol) of trimethylaluminumwas added under nitrogen atmosphere with stirring. The resulting mixture was allowed to react at room temperature for 2 hours to obtain an aluminum porphyrin complex, i.e., a compound represented by general formula (III) above in which Y=a methyl group, $A^1$ and $A^2$=a hydrogen atom, respectively, $A^3$=a phenyl group.

REFERENCE EXAMPLE 2

Preparation of Polymerization Initiator Solution B

In a sufficiently dried egg-plant type flask provided with a stirrer were charged 0.61 g (1 mmol) of meso-tetraphenylporphyrin and 20 ml of methylene chloride as a solvent. To the mixture was added 1.2 mmol of diethylaluminum chloride was added under nitrogen atmosphere with stirring. The resulting mixture was allowed to react at room temperature for 2 hours. After completion of the reaction, excessive diethylaluminum chloride was evaporated off together with the solvent to obtain a solid aluminum porphyrin complex. To this was added again 20 ml of methylene chloride to obtain a methylene chloride solution of an aluminum porphyrin complex represented by general formula (III) above in which Y=a chlorine atom, $A^1$, and $A^2$=a hydrogen atom, respectively, A=a phenyl group.

REFERENCE EXAMPLE 3

Preparation of Polymerization Initiator Solution C

Methanol (2.5 ml) was added to 20 ml of the polymerization initiator solution B above under nitrogen atmosphere with stirring, and the resulting mixture was allowed to react at room temperature for 15 hours. After evaporating off excessive methanol together with the methylene solution, 20 ml of methylene chloride was added again to obtain a methylene chloride solution of an aluminum porphyrin complex represented by general formula (III) above in which Y=a methoxy group, $A^1$ and $A^2$=a hydrogen atom, respectively, $A^3$=a phenyl group.

REFERENCE EXAMPLE 4

Preparation of Organic Aluminum Compound Solution D

In a sufficiently dried egg-plant type flask provided with a stirrer was sufficiently dried 0.525 g (2 mmol) of 2,4,6-tri-tert-butylphenol recrystallized from hexane. After completion of the drying, 3.3 ml of methylene chloride was added thereto. Then, under nitrogen atmosphere, 0.9 ml (1 mmol) of trimethylaluminum was slowly added dropwise with ice-cooling and stirring, and the mixture was mixed in the dark at room temperature for 1 hour to obtain a methylene chloride solution of methylaluminum bis(2,4,6-tri-tert-butylphenoxide) (mmol/3.3ml).

REFERENCE EXAMPLE 5

Preparation of Organic Aluminum Compound Solution E

In a sufficiently dried egg-plant type flask provided with a stirrer was sufficiently dried 0.361 g (2 mmol) of 3-tert-butyl-4-hydroxyanisole recrystallized from hexane. After completion of the drying, 3.3 ml of methylene chloride was added thereto. Then, under nitrogen atmosphere, 0.9 ml (1 mmol) of trimethylaluminum was slowly added dropwise with ice-cooling and stirring, and the mixture was mixed in the dark at room temperature for 1 hour to obtain a methylene chloride solution of methylaluminum bis(3-tert-butyl-4-methoxyphenoxide) (1 mmol/3.3 ml).

REFERENCE EXAMPLE 6

Preparation of Organic Aluminum Compound Solution F

In a sufficiently dried egg-plant type flask provided with a stirrer was charged 0.148 g (2 mmol) of sufficiently purified isobutanol, which was sufficiently dried. After completion of the drying, 3.3 ml of methylene chloride was added thereto. Then, under nitrogen atmosphere, 0.9 ml (1 mmol) of trimethylaluminum was slowly added dropwise with ice-cooling and stirring, and the mixture was mixed in the dark at room temperature for 1 hour to obtain a methylene chloride solution of methylaluminum bis(isobutoxide) (1 mmol/3.3 ml).

REFERENCE EXAMPLE 7

Preparation of Organic Aluminum Compound Solution G

In a sufficiently dried egg-plant type flask provided with a stirrer was charged 0.176 g (2 mmol) of sufficiently purified isobutyric acid, which was sufficiently dried. After completion of the drying, 3.3 ml of methylene chloride was added thereto. Then, under nitrogen atmosphere, 0.9 ml (1 mmol) of trimethylaluminum was slowly added dropwise with ice-cooling and stirring, and the mixture was mixed in the dark at room temperature for 1 hour to obtain a methylene chloride solution of methylaluminum bis(isobutyrate) (1 mmol/3.3 ml).

EXAMPLES 1 TO 5

In each of 100 ml-flasks purged with nitrogen was charged 8 ml (0.2 mmol) of the polymerization initiator solution A, to which were added various methacrylic acid esters in amounts shown in Table 1. Each mixture was irradiated with a visible light while stirring with a magnetic stirrer under nitrogen atmosphere at 35° C. for about 2 hours to initiate polymerization. Thereafter, the organic aluminum compound solution F was added thereto under nitrogen atmosphere at room temperature in a predetermined amount and the resulting mixture was allowed to polymerize for a predetermined time as shown in Table 1.

EXAMPLES 6 TO 9

In each of 50 ml-flasks purged with nitrogen was charged 4 ml (0.2 mmol) of the polymerization initiator solution B, to which were added methylene chloride, propylene oxide and the organic aluminum compound solution D in proportions shown in Table 1 under nitrogen atmosphere at room temperature with stirring using a magnetic stirrer. The resulting mixture was allowed to polymerize under nitrogen atmosphere at room temperature for a predetermined time.

EXAMPLE 10

In a 50 ml-flask purged with nitrogen was charged 4 ml (0.2 mmol) of the polymerization initiator solution C, and the solvent was evaporated off. Then, the organic aluminum compound solution D was charged in an amount shown in Table 1, and the solvent was evaporated off again. This system was kept at 50° C. and δ-valerolactone was charged to the system in an amount shown in Table 1, and the resulting mixture was allowed to polymerize in bulk under nitrogen atmosphere at 50° C. for a predetermined time.

EXAMPLE 11

In a 100 ml-flask purged with nitrogen was charged 8 ml (0.2 mmol) of the polymerization initiator solution A, to which was added a methacrylic acid ester in an amount shown in Table 1. The mixture was irradiated with a visible light while stirring with a magnetic stirrer under nitrogen atmosphere at 35° C. for about 2 hours to initiate polymerization. Thereafter, the organic aluminum compound solution F was added thereto under nitrogen atmosphere at room temperature in a predetermined amount and the resulting mixture was allowed to polymerize for a predetermined time as shown in Table 1.

EXAMPLE 12

In a 100 ml-flask purged with nitrogen was charged 8 ml (0.2 mmol) of the polymerization initiator solution A, to which was added a methacrylic acid ester in an amount shown in Table 1. The mixture was irradiated with a visible light while stirring with a magnetic stirrer under nitrogen atmosphere at 35° C. for about 2 hours to initiate polymerization. Thereafter, the organic aluminum compound solution G was added thereto under nitrogen atmosphere at room temperature in a predetermined amount and the resulting mixture was allowed to polymerize for a predetermined time as shown in Table 1.

COMPARATIVE EXAMPLE 1

In a 100 ml-flask purged with nitrogen was charged 8 ml (0.2 mmol) of the polymerization initiator solution A, to which was added methyl methacrylate in an amount shown in Table 1. The mixture was irradiated with a visible light while stirring with a magnetic stirrer under nitrogen atmosphere at 35° C. for about 2 hours to initiate polymerization. Thereafter, the mixture was allowed to polymerize at room temperature for a predetermined time with adding no organic aluminum compound.

COMPARATIVE EXAMPLE 2

In a 50 ml-flask purged with nitrogen was charged 8 ml (0.2 mmol) of the polymerization initiator solution A, to which was added methyl methacrylate in an amount of 100-fold. The mixture was irradiated with a visible light while stirring with a magnetic stirrer under nitrogen atmosphere at 35° C. for about 1 hour to initiate polymerization. Thereafter, an organic metal compound was added thereto at a low temperature in a predetermined proportion to the aluminum porphyrin complex and the mixture was allowed to polymerize for a predetermined time.

COMPARATIVE EXAMPLE 3

In a 50 ml-flask purged with nitrogen was charged 4 ml (0.2 mmol) of the polymerization initiator solution B, to which were added methylene chloride and propylene oxide in proportions shown in Table 1 under nitrogen atmosphere at room temperature with stirring using a magnetic stirrer. The resulting mixture was allowed to polymerize at room temperature for a predetermined time.

COMPARATIVE EXAMPLE 4

In a 50 ml-flask purged with nitrogen was charged 4 ml (0.2 mmol) of the polymerization initiator solution C, and the solvent was evaporated off. Then, this system was kept at 50° C. under $N_2$ atmosphere, and 40 mmol of δ-valerolactone was added thereto, followed by polymerization in bulk at 50° C. for a predetermined time.

In the aforementioned examples and comparative examples, after the completion of the polymerization and after the removal of the solvent and unused monomers, the molecular weight and molecular weight distribution were obtained by gel permeation chromatography (GPC) (polystyrene standard). Polymerization conditions and results are shown in Table 1. When a visible light was to be irradiated, a Xenon lamp was used as a light source, and a light with a wavelength region of 420 nm or smaller being cut with filter was irradiated.

TABLE 1

| | Polymerization temperature | Monomer Compound Name | Monomer Molar Ratio*1 | Aluminum Compound Solution | Aluminum Compound Molar Ratio*2 |
|---|---|---|---|---|---|
| Example | | | | | |
| 1 | A | MM[1] | 200 | E | 3.0 |
| 2 | A | EM[2] | 200 | E | 0.5 |
| 3 | A | nBm[3] | 200 | E | 0.5 |
| 4 | A | IpM[4] | 200 | E | 0.5 |
| 5 | A | IbM[5] | 200 | E | 0.5 |
| 6 | B | PO[6] | 200 | D | 0.05 |
| 7 | B | PO[6] | 200 | D | 0.2 |
| 8 | B | PO[6] | 200 | D | 0.5 |
| 9 | B | PO[6] | 200 | D | 5.0 |
| 10 | C | δVL[7] | 200 | D | 0.2 |
| 11 | A | MM[1] | 200 | F | 0.5 |
| 12 | A | MM[1] | 200 | G | 0.5 |
| Comparative Example | | | | | |
| 1 | A | MM[1] | 100 | — | — |
| 2 | A | MM[1] | 100 | TMA[8] | 3.0 |
| 3 | B | PO[6] | 200 | — | — |
| 4 | C | δVL[7] | 200 | — | — |

| | Polymerization temperature | Polymerization time (min) | Polymerization ratio (%) | Molecular weight & molecular weight distribution of polymer Mn | Mw/Mn |
|---|---|---|---|---|---|
| Example | | | | | |
| 1 | Room temp. | 0.5 | 100 | 22,000 | 1.11 |
| 2 | " | 0.5 | 100 | 27,700 | 1.09 |
| 3 | " | 0.5 | 100 | 34,900 | 1.07 |
| 4 | " | 0.5 | 100 | 30,900 | 1.10 |
| 5 | " | 0.5 | 100 | 36,300 | 1.07 |
| 6 | " | 3 | 51.4 | 8,500 | 1.08 |
| 7 | " | 3 | 81.2 | 10,500 | 1.10 |
| 8 | " | 3 | 92.1 | 12,100 | 1.20 |
| 9 | " | 3 | 94.1 | 12,000 | 1.24 |
| 10 | 50° C. bulk | 9.5 | 72.0 | 18,000 | 1.20 |
| 11 | Room temp. | 10 | 63.2 | 16,000 | 1.36 |
| 12 | " | 60 | 52.0 | 12,000 | 1.30 |
| Comp. Example 1 | Room temp. | 60 | 19.0 | 2,100 | 1.14 |
| Comp. Example 2 | −40° C. | 60 | 91.0 | 9,700 | 1.17 |
| Comp. Example 3 | Room temp. | 420 | 19.8 | 3,300 | 1.05 |
| Comp. Example 4 | 50° C. bulk | 529 hours | 47.8 | 7,700 | 1.05 |

Notes:
*1 monomer/initiator
*2 Aluminum compound/initiator
MM[1]: methyl methacrylate
EM[2]: ethyl methacrylate
nBM[3]: n-butyl methacrylate
IpM[4]: isopropyl methacrylate
IbM[5]: isobutyl methacrylate
PO[6]: propylene oxide
δVL[7]: δ-valerolactone
TMA[8]: trimethylaluminum

What is claimed is:

1. A living polymerization method for polymerizing at least one monomer selected from the group consisting of (meth)acrylic acid esters, epoxides and lactones using a metal porphyrin complex as a polymerization initiator, wherein said metal porphyrin complex has a central metal site occupied by a metal selected from the group consisting of magnesium, aluminum, vanadium, chromium, manganese, iron, cobalt, nickel, copper, zinc, ruthenium, rhodium, palladium and cadmium, and said living polymerization is performed using as a cocatalyst at least one organic aluminum compound selected from the group consisting of compounds represented by general formulae (I) and (II) below:

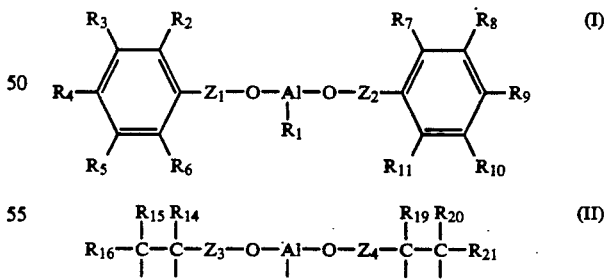

wherein $R_1$ represents a halogen atom, a $C_1$–$C_8$ alkyl group, a $C_1$–$C_8$ haloalkyl group, a $C_2$–$C_8$ alkenyl group, a $C_6$–$C_{14}$ aryl group or a $C_7$–$C_{20}$ aralkyl group;

$R_2$, $R_4$, $R_6$, $R_7$, $R_9$ and $R_{11}$ independently represent a hydrogen atom, a halogen atom, a $C_1$–$C_{20}$ alkyl group, $C_1$–$C_{20}$ alkoxy group, or a $C_6$–$C_{14}$ aryl group;

$R_3$, $R_5$, $R_8$ and $R_{10}$ independently represent a hydrogen atom, or a halogen atom;

$Z_1$ and $Z_2$ independently represent a simple chemical bond,

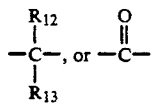

where, $R_{12}$ and $R_{13}$ independently represent a hydrogen atom, a $C_1$-$C_{20}$ alkyl group or a $C_6$-$C_{14}$ aryl group;

$R_{14}$, $R_{15}$, $R_{16}$, $R_{17}$, $R_{18}$, $R_{19}$, $R_{20}$, $R_{22}$ and $R_{23}$ independently represent a hydrogen atom, a halogen atom, a $C_1$-$C_{20}$ alkyl group, or a $C_1$-$C_{20}$ alkoxy group; and $Z_3$ and $Z_4$ independently represent chemical bond,

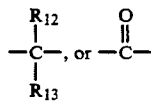

where, $R_{12}$ and $R_{13}$ have the same meanings as defined above.

2. The method as claimed in claim 1, wherein said metal porphyrin complex is an aluminum porphyrin complex.

3. The method as claimed in claim 2, wherein said aluminum porphyrin complex is a compound represented by general formula (III) below:

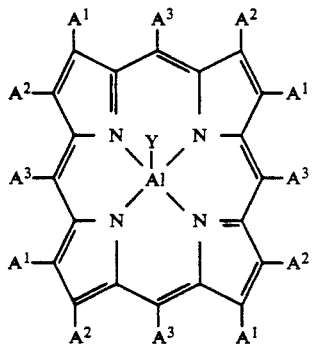

(III)

wherein $A^1$ and $A^2$ independently represent a hydrogen atom, or a monovalent $C_1$-$C_{10}$ hydrocarbon group;

$A^3$ represents a hydrogen atom or a monovalent $C_1$-$C_{20}$ hydrocarbon group which may be substituted with at least one substituent selected from a halogen atom, a $C_1$-$C_8$ alkoxy group, and a $C_2$-$C_8$ alkoxycarbonyl group; and Y represents an axial ligand.

4. The method as claimed in claim 1, wherein in said formula (I), $R_1$ represents a $C_1$-$C_4$ alkyl group, a $C_1$-$C_4$ haloalkyl group, a $C_2$-$C_4$ alkenyl group, or a $C_6$-$C_{10}$ aryl group;

at least one of $R_2$, $R_4$ and $R_6$, and at least one of $R_7$, $R_9$ and $R_{11}$ independently represent a halogen atom, a $C_1$-$C_8$ alkyl group, a $C_1$-$C_8$ alkoxy group, or a phenol group, and remainders are each a hydrogen atom; and $R_3$, $R_5$, $R_8$ and $R_{10}$ independently represent a hydrogen atom or a halogen atom; and $R_{12}$ and $R_{13}$ independently represent a hydrogen atom, a $C_1$-$C_8$ alkyl group or a phenyl group.

5. The method as claimed in claim 1, wherein in said formula (II), $R_1$ represents a $C_1$-$C_4$ alkyl group, a $C_1$-$C_4$ haloalkyl group, a $C_2$-$C_4$ alkenyl group, or a $C_6$-$C_{10}$ aryl group;

at least one of $R_{14}$, $R_{15}$, $R_{16}$, $R_{17}$ and $R_{18}$, and at least one of $R_{19}$, $R_{20}$, $R_{21}$, $R_{22}$ and $R_{23}$ independently represent a halogen atom, a $C_1$-$C_8$ alkyl group, or a $C_1$-$C_8$ alkoxy group; and the remainders are each a hydrogen atom; and $R_{12}$ and $R_{13}$ independently represent a hydrogen atom, or a $C_1$-$C_8$ alkyl group.

6. The method as claimed in claim 1, wherein said organic aluminum compound is a compound selected from the group consisting of:
methylaluminum bis(2,4-di-tert-butylphenoxide),
methylaluminum bis(2,4,6-tri-tertbutylphenoxide),
methylaluminum bis(2-tert-butyl-4-methoxyphenoxide),
methylaluminum bis(2-phenylphenoxide),
methylaluminum bis(2,6-dichlorophenoxide),
methylaluminum bis(tetrafluorophenoxide),
methylaluminum bis(2,6-dimethoxyphenoxide),
methylaluminum bis(2-biphenylmethoxide),
methylaluminum bis(benzhydroxide),
methylaluminum bis(triphenylcarbinoxide),
methylaluminum bis(phenylcarbonate),
methylaluminum bis(4-methylphenylcarbonate),
methylaluminum bis(4-methoxyphenylcarbonate),
methylaluminum bis(2-biphenylcarbonate),
methylaluminum bis(isobutoxide),
methylaluminum bis(sec-butoxide),
methylaluminum bis(butyrate), and
methylaluminum bis(isobutyrate).

7. The method as claimed in claim 6, wherein said organic aluminum compound is:
methylaluminum bis(2,4,6-tri-tert-butyl-phenoxide),
methylaluminum bis (2-tert-butyl-4-methoxyphenoxide),
methylaluminum bis(isobutoxide), or
methylaluminum bis(isobutyrate).

8. The method as claimed in claim 1, wherein said (meth)acrylic acid ester is selected from the group consisting of methyl (meth)acrylate, ethyl (meth)acrylate, isopropyl (meth)acrylate, butyl (meth)acrylate and isobutyl (meth)acrylate.

9. The method as claimed in claim 1, wherein said epoxide is a $C_2$-$C_4$ alkylene oxide.

10. The method as claimed in claim 1, wherein said lactone is selected from the group consisting of γ-butyrolactone, δ-valero-lactone and ε-caprolactone.

11. The method as claimed in claim 1, wherein said living polymerization is performed in the presence of an aprotic solvent under an inert gas atmosphere.

12. The method as claimed in claim 11, wherein said living polymerization is performed at a temperature within the range of between about $-78°$ C. and a reflux temperature of said solvent.

13. The method as claimed in claim 1, wherein said metal porphyrin complex is used in an amount within the range of between 0.0005 mole and 0.2 mole per mole of said monomer.

14. The method as claimed in claim 1, wherein said organic aluminum compound is used in an amount within the range between 0.001 mole and 500 moles per mole of said metal porphyrin complex.

15. The method as claimed in claim 14, wherein said organic aluminum compound is used in an amount within the range between 0.001 mole and 50 moles per mole of said metal porphyrin complex.

16. The method as claimed in claim 1, wherein product of the method has a number average molecular weight within the range between 500 to 200,000.

17. The method as claimed in claim 1, wherein said monomer is a (meth)acrylic acid ester, and said polymerization is performed under irradiation of a light.

18. A living polymer obtained by the method of claim 1.

* * * * *